United States Patent
Bonde

[19]

[11] Patent Number: 6,050,065
[45] Date of Patent: Apr. 18, 2000

[54] PACKAGING MACHINE

[76] Inventor: Tommy Bonde, Edv. Egebergs Vej 6, Svejbaek, DK-8600, Silkeborg, Denmark

[21] Appl. No.: 09/147,150
[22] PCT Filed: Apr. 17, 1997
[86] PCT No.: PCT/DK97/00170
  § 371 Date: Dec. 4, 1998
  § 102(e) Date: Dec. 4, 1998
[87] PCT Pub. No.: WO97/38905
  PCT Pub. Date: Oct. 23, 1997

[30] Foreign Application Priority Data

Apr. 17, 1996 [DK] Denmark ................................ 0446/96

[51] Int. Cl.[7] ....................................................... B65B 51/30
[52] U.S. Cl. ........................... 53/550; 53/374.6; 53/371.6
[58] Field of Search ..................... 53/550, 371.6, 53/374.5, 374.6, 375.4

[56] References Cited

U.S. PATENT DOCUMENTS

| | | | |
|---|---|---|---|
| 3,237,371 | 3/1966 | Gerlach | 53/550 |
| 4,553,377 | 11/1985 | Klinkel | 53/550 |
| 5,271,210 | 12/1993 | Tolson | 53/550 |
| 5,367,859 | 11/1994 | Suga | 53/550 |
| 5,904,027 | 5/1999 | Bonde | 53/374.6 |

FOREIGN PATENT DOCUMENTS

| | | |
|---|---|---|
| 2 638 420 | 5/1990 | France . |
| 34 11 368 | 10/1985 | Germany . |

*Primary Examiner*—John Sipos
*Attorney, Agent, or Firm*—Sixbey, Friedman, Leedom & Ferguson; David S. Safran

[57] ABSTRACT

In a driving system for the cross closing jaw (16) of a continually operating flow packing machine it is customary that the drive motor (30) for the vertical movements of the jaw is mounted on the sledge (8) reciprocating the jaws along the conveying path. According to the invention, the motor (30) should not participate in these movements as it is mounted in a stationary manner for driving a longitudinally extending shaft (20) which cooperates with a driving bushing mounted on the sledge so as to be slidable along the shaft (20) and operating to control the said vertical movements.

4 Claims, 2 Drawing Sheets

PACKAGING MACHINE

The present invention relates to a packaging machine of the flowpacking type, i.e. for individual packaging of products advanced in a line with mutual spacing, the products being packed in a tubular web of packaging material, which is currently advanced to a cross closing station in which a set of jaw tools is reciprocated in such a manner that during each forward stroke the jaws are forced together so as to cross close the tubular web and preferably also cross cut this web, while during the following return stroke the jaws are kept spaced apart such that the jaw set can be freely returned along the succeeding product for being reclosed behind the rear end of this product, causing the product to be fully enclosed during the following advancing sequence of the tool set.

The tool set typically comprises two horizontal stamping or welding jaws which should carry out vertical movements during both the forward and the rearward stroke. Usually, this is realized in a manner which, in principle, is rather simple, viz. by arranging for a suitable motor equipment mounted on a reciprocable carrier sledge for the jaw tools and driving the jaws vertically.

This design may well be simple in principle, but it presents some drawbacks. The horizontal reciprocation of the driving means for the vertical movements requires repeated accelerations and decelerations of these driving means, which appear with a noticeable weight on the said sledge, whereby the complete system should be rather heavily constructed. Also, it is problematic to establish the required power supply to the driving means on the moved sledge by means of flexible hoses or cables, as these will be subjected to a huge number of movements by the packing of the lot of products.

On this background it has already been proposed to arrange for a sliding mechanical power transmission from a stationary motor for effecting the vertical movements of the jaw tools during the horizontal movements thereof. Thus, in U.S. Pat. No. 4,553,377 it is disclosed that the jaw set, a carrying base of which is reciprocated along fixed horizontal guiding rods, is in slidable operative connection with a likewise horizontal, but vertically moved guiding rail, such that the latter, by means of a separate and relatively complicated moving system with a stationary motor, may be raised and lowered for effecting the vertical movements of the jaws. Another proposal is known from U.S. Pat. No. 5,367,859, by which the jaw system, again guided horizontally along separate, fixed guiding rods, is connected with a grooved shaft horizontally extending in the direction of the reciprocation so as to project in a slidable manner through a stationary coupling nut, which is motor driven for achieving a rotation of the sliding grooved shaft to thereby effect the desired vertical movements of the jaws.

FR-2,638,420 provides a solution, where the horizontal movements of the jaw set are effected from stationary moving means in the form of a rotating driving wheel engaging the tool sledge by means of a connecting rod, while the vertical movements of the jaws are effected by a push rod system connected to the same driving wheel.

The above mentioned proposals for improvements are relatively complicated and voluminous, because driving means are used in positions entirely outside the moving area of the system and use is made of guiding means for the tool sledge and, in parallel therewith, transmission means for the vertical movements of the jaws.

With the present invention it has been realized that it is possible to fully integrate the said guiding and transmission means, viz. with the use of a rotatable guiding shaft which is in engagement with the tool sledge both for guiding the same axially and—by means of a slidable ring member on the sledge—for rotating this ring member, which may then in turn, through a simple, co-moved tansmission such as a driving chain or pinion, drive the jaw tools vertically, controlled by a fixed driving motor for the guiding shaft. The latter transmission can exhibit a relatively low weight, implying only a slight increase of the inertia of the horizontally moved system.

With the use of a shaft guiding it is natural to use two shafts, one at either side, and this may be used to the effect that there is arranged a vertical drive for the jaws at both sides, whereby edging tendencies of the jaws can be avoided. The two shafts, of course, should be driven fully synchronously, but this is easily enabled by means of a transverse gear shaft.

In connection with the invention it has also been found possible to provide for a partial integration of the said driving system and the system responsible for the horizontal reciprocation of the tool sledge, this being further described below.

In the following the invention is described in more detail with reference to the drawing, in which.

Figure 1:
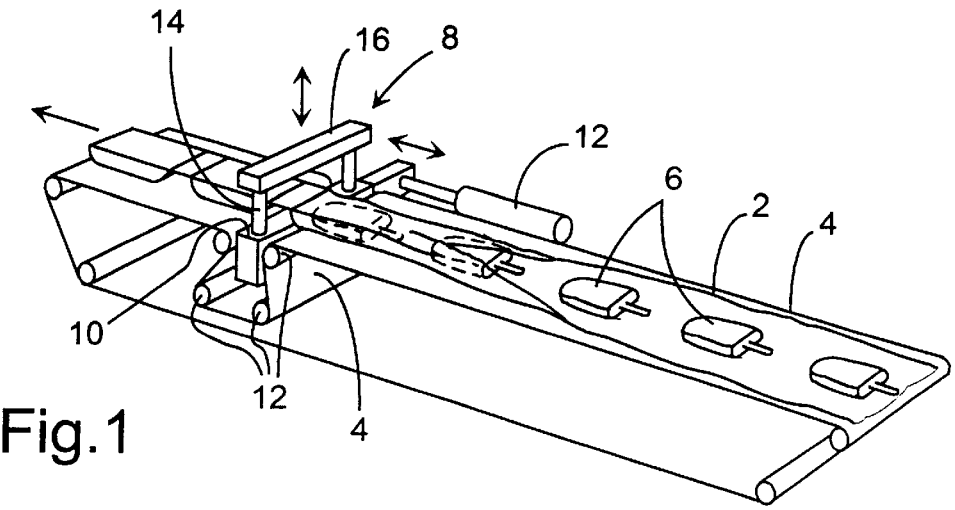
FIG. 1 is a schematic perspective view of a flow paching apparatus.

In the apparatus shown in FIG. 1, a paper or other web 2 is advanced on a conveyor 4 and a row of products 6 are conveyed on the web 2 in mutually spaced positions. The web 2 is currently folded upwardly and inwardly by means of non-illustrated guiding means, such that the products are enclosed in a hose which is formed by passing through a non-illustrated length seaming station.

Thereafter, the hose passes a cross closing and cutting station 8 which comprises a horizontally reciprocable lower beam 10 holding at both sides of the station sets of upper and lower diverter rollers 12 for the belt 2, such that this belt even during horizontal movement of the unit 8 will extend through a loop 14 underneath the beam 10, while at the top it is located close to the beam. In the schematically shown apparatus the cross beam 10 is in driving connection with a working cylinder 12 arranged so as to impart to the unit 8 a working stroke with the same speed as that of the belt 2 and thereafter a rapid return stroke.

The beam 10, by means of posts 14, carries an overlying traverse 16, and in a manner not shown it is provided with means for raising and lowering the posts 14, such that during the said working stroke the traverse 16 can be controlled to be forced down against the beam 10 for cross closing the packaging hose by stamping or welding, while during the return stroke the traverse 16 may be raised for enabling a return passage along the subsequent product, which will then, in turn, be totally enclosed in a section of the packaging hose during the following working stroke of the cylinder 12.

Preferably, the beam/traverse system 10,16 is additionally provided with knife means for cross cutting the joined areas of the packaging hose, such that the products delivered will be mutually separated and packed single products.

The vertical movements of the traverse 16 should be effected in a rapid and efficient manner, and it is customary that the driving means for this purpose are provided in direct connection with the beam 10, whereby they they will noticeably increase the mass of the structure 8 to be reciprocated and thus to be repeatedly accelerated and decelerated. Moreover, such moved driving means should be connected with a fixed power supply through a flexible driving connector means, imposing high requirements on such a flexible connection.

Figure 2:
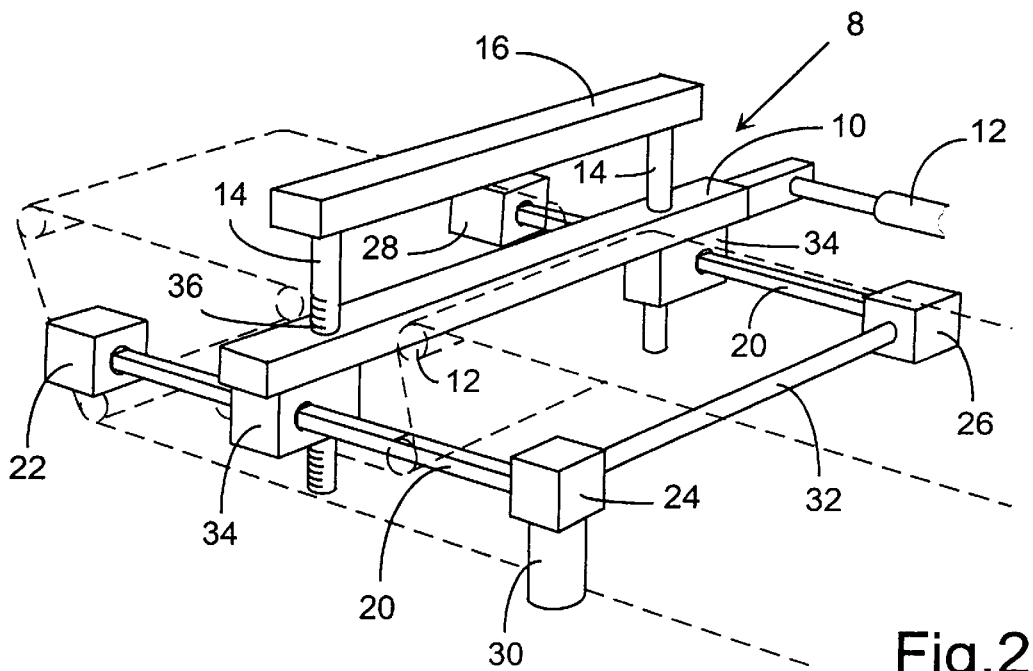
FIG. 2 is a corresponding view of a vital part of the apparatus, designed according to the invention.

In FIG. 2, the movable unit 8 is shown in connection with a driving system according to the invention. In principle, it is not decisive how the unit is driven for reciprocation, so for simplicity the connection to the driving cylinder 12 is shown also in this Figure. However, as described below, this drive may be made with a certain degree of integration with the special driving arrangement according to the invention.

According to FIG. 2, the reciprocal unit 8 is mounted on a pair of opposed, parallel guiding shafts 20 extending between respective fixed bearing housings 22,24 and 26,28. The housing 24 is provided as a gear housing connected with a servomotor 30, which operates to drive both the associated shaft 20 and, in synchronism therewith, a transverse shaft 32 which, through the bearing and gear housing 26, is in driving connection with the opposite guiding shaft 20.

Through gear boxes 34 the unit 8 is in sliding driving connection with the respective guiding shafts 20, these being made with a non-circular cross section such that they can be in sliding rotary driving connection with respective pinions inside the gear boxes 34. At their peripheries, these pinions engage with toothings 36 on the posts 14, such that a rotation of the shafts 20 will invoke a displacement up or down of the posts 14 and therewith of the traverse 16, no matter the position of the unit 8 on the shafts 20.

It will be understood, therefore, that with a controlled operation of the stationary servo motor 30 it is possible to effect the desired lowerings and raisings of the traverse 16, without the motor 30 having to participate in the reciprocation of the unit 8. Thus, the motor will not add weight to this unit, and it can be connected to its power source through fixed conductors.

The shafts may be shaped with any non-circular cross section, whether it is polygonal or generally circular, yet made with a facet or a rib or a groove, with which the cooperating pinion can be in slidable rotary engageent.

Figure 3:
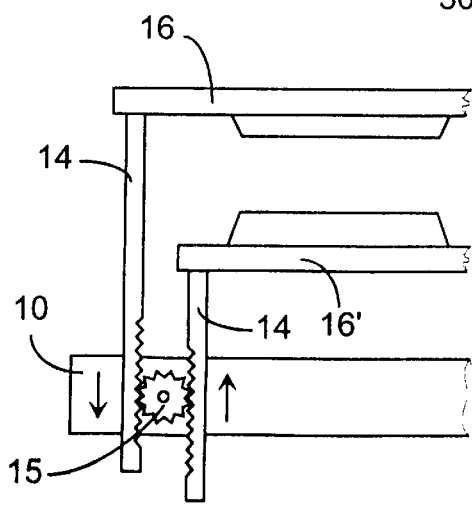
FIG. 3 is a plan view of a modified drive system therein.

FIG. 3 illustrates a preferred, yet well known arrangement, where the lower beam 10 carries two jaws 16 and 16', each mounted on respective tooth rods 14 and 14' engaging with an intermediate pinion 15 on the beam 10. Hereby the the jaw tools can be controlled so as to move towards and away from each other and thus, in a desirable manner, effect the cross closing in a level somewhat above the support level of the products. The pinion 15 may well represent the ring member or pinion slidingly cooperating with the rotary shaft 20.

It will be an at least theoretical possibility that with the use of monolateral control the two shafts may control the vertical movements of the respective jaws 16 and 16', such that with associated respective step or servo motors it will be easy to make adjustments with respect to stroke height and meeting level of the jaws.

Figure 4:
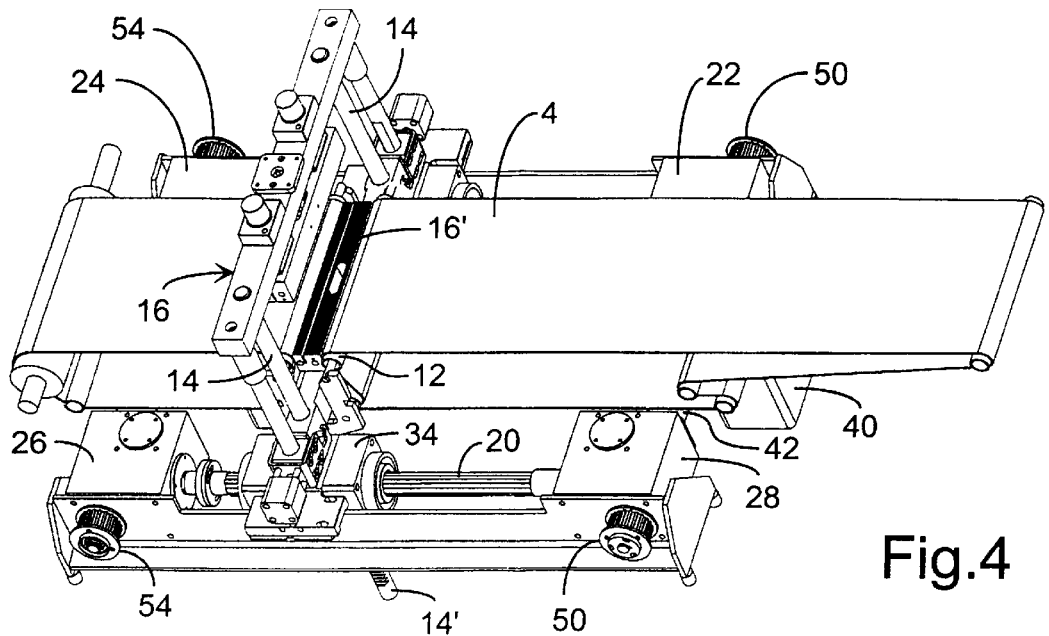
FIGS. 4 and 5 are perspective views of an apparatus according to the invention, seen from above and below, respectively.
Figure 5:
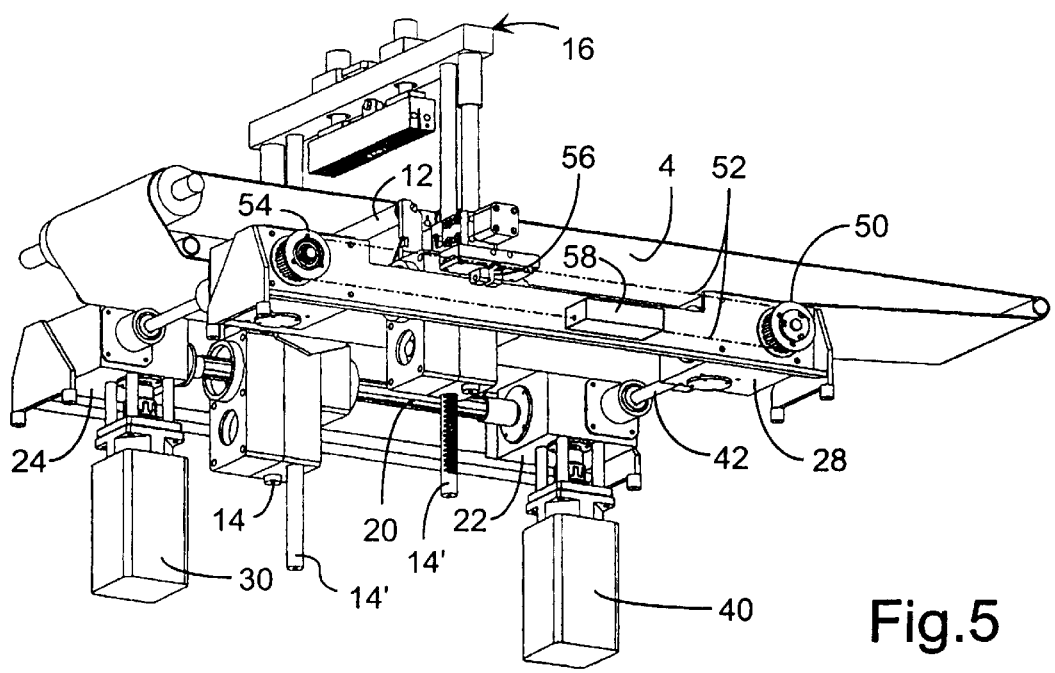

FIGS. 4 and 5 show in more detail a preferred embodiment of an apparatus according to the invention. For that apparatus it is characteristic that the cylinder 12 has been replaced by a driving motor 40 which, through the gear box and a transverse shaft 42 projecting therefrom, drives a pair of opposed, exterior pinions or toothed belt wheels 50, which cooperate with longitudinal chains or toothed belts 52, in their turn running about corresponding, freely revolving rollers 54 held by the boxes 24 and 26. At their upper runs, at 56, these driving chains or belts are fixed to the entire displaceable unit 8 for reciprocating the same, whereby the driving system 40,48,50,52 replaces the cylinder 12 of FIGS. 1 and 2. On the lower run a counterweight 58 may be placed. The two motors 30 and 40 with associated driving connections may, despite the disclosed partial integration, operate fully independently of each other, although they should of course be controlled in a highly coordinated manner.

It should be noted that the invention is not limited to be used in connection with a horizontally directed conveying of the products, as the disclosed principles are basically independent of the spatial orientation of the conveying direction; it is already known that the conveying direction can be vertical.

I claim:

1. A packaging machine of the flowpacking type, comprising a conveyor line for a continuously advanced packaging web, to which products to be packed are supplied successively, a length joining station for joining the packaging web to form a hose about the mutually separated products, and a cross joining station for closing this hose between the consecutive products and preferably also for cutting the hose in order to form separated, fully enclosed products, said cross joining station comprising two opposed, parallel jaw tools connected with a moving system for moving the jaws in two different main directions, viz. for imparting to the jaws, respectively, a working movement towards and away from each other and a reciprocating transport movement along said conveyor line for cooperation with successive cross joining areas on the advanced hose, the jaw tools being mounted opposite to each other on a sledge, which is mounted and driven so as to be reciprocally moves along a section of the conveyor line, while the jaws are mounted on this sledge so as to be cross displaceable towards and away from each other driven through movable transmission means from a motor which does not participate in the reciprocations of the sledge, characterized in that said transmission means comprise a rotary bushing which is mounted on the sledge and, in a longitudinally displaceable manner, is in operative engagement with a rotary shaft having a non-circular cross section and extending in a fixed position in said cross joining station along the moving path of the sledge, said rotary shaft being driven by a driving motor likewise mounted in a fixed position in the cross joining station.

2. A packaging machine according to claim 1, in which the tool sledge is guided on longitudinally extending guiding beds, characterized in that at least one of these beds is constituted by said rotary shaft.

3. A packaging machine according to claim 1, characterized in that the relevant driving system is provided at one side of the conveyor line, and that a similar system is provided also at the other side, these two systems being driven in synchronism from a common motor for rotation of the two rotary shafts and therewith for effectivly moving the respective opposite ends of the cross movable jaw tool.

4. A packaging machine according to claim 3, characterized in that the cross joining station comprises two parallel side beams each having at either end a transmission box, the said rotary shafts extending in the longitudinal direction between respective pairs of these boxes, while in the transverse direction there is arranged two other rotary driving shafts between the respective boxes, a first one of these driving shafts serving to drive the first mentioned rotary shafts, while the other serves to drive laterally opposite chain or toothed belt wheels for respective chains or toothed belts extending in the longitudinal direction to freely rotatable sprocket wheels mounted on or next to said first driving shaft, said chains or toothed belts being connected to the sledge for effecting the reciprocations thereof.

* * * * *